Sept. 19, 1944.                N. S. REYNOLDS                2,358,536
                                    SEAL
                              Filed March 9, 1942
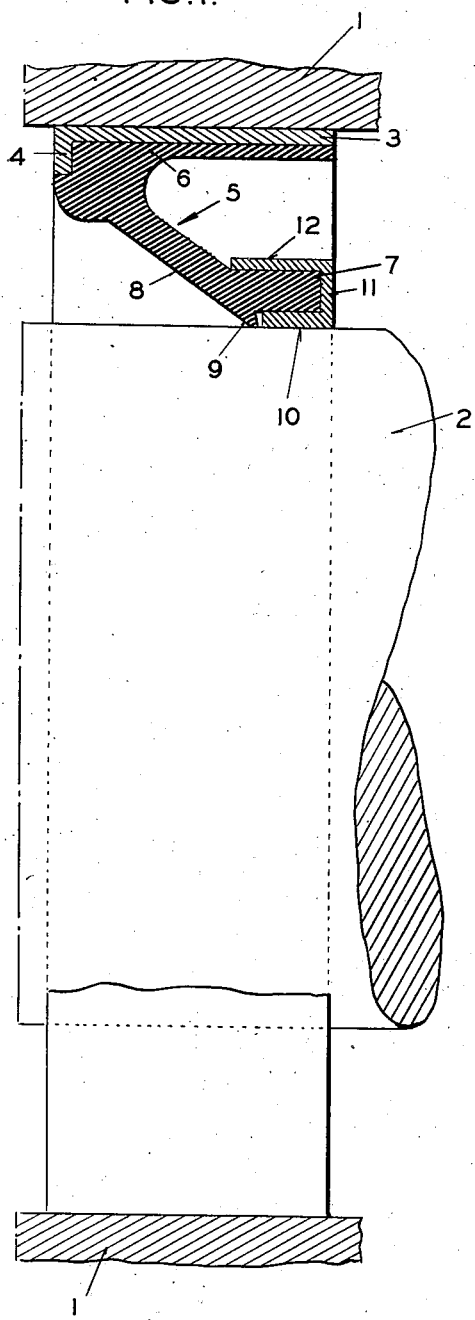
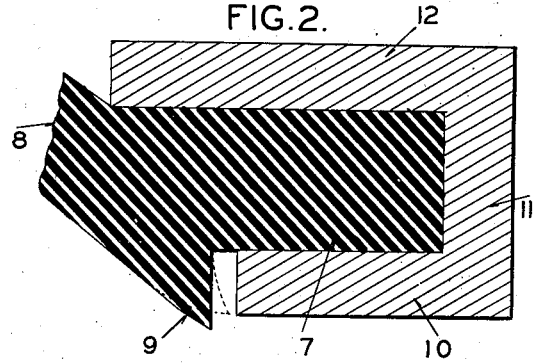
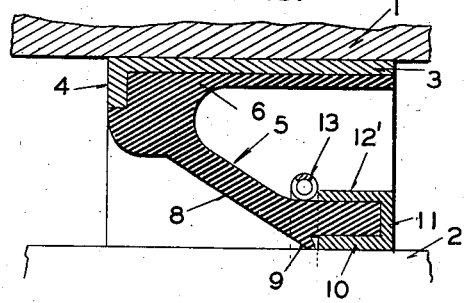
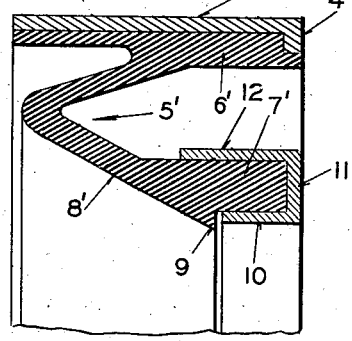
INVENTOR
N. S. REYNOLDS
BY
ATTORNEY Patented Sept. 19, 1944

2,358,536

UNITED STATES PATENT OFFICE 2,358,536

SEAL

Noel S. Reynolds, St. Louis, Mo.

Application March 9, 1942, Serial No. 433,891

9 Claims. (Cl. 288—3)

My invention relates to seals and more particularly to an improved seal for use between two relatively rotatable members.

One of the objects of my invention is to produce an improved seal of the type referred to which will be so constructed that excessive thrust on the sealing surface will be eliminated, thereby prolonging the wear of the seal.

Another object of my invention is to associate with the annular sealing edge or surface of a seal which has relative movement to another annular surface, means whereby all the thrust or at least a major portion thereof occasioned by an eccentric movement between the two relatively rotatable members which are being sealed will be prevented from being transferred to said sealing edge or surface.

Other objects of my invention will become apparent from the following description taken in connection with the accompanying drawing in which Figure 1 is a sectional view showing a seal embodying my invention, said seal being mounted in operative position between two relatively rotatable members; Figure 2 is an enlarged sectional view of a portion of the seal as it exists prior to being mounted in an operative position; Figure 3 is a sectional view of a slight modification for use where it is desired to use a garter spring in the seal; and Figure 4 is a sectional view of another seal construction embodying my invention.

Referring first to Figures 1 and 2, my improved seal may be used between any two relatively rotatable members but is shown, by way of example only, as being employed as a sealing means between a fixed member 1 and a rotating shaft 2, said shaft having bearing support on said fixed member which may be a surrounding housing of a wall through which the shaft extends. The seal has a cylindrical housing member 3 of suitable material such as metal and at one end is provided with an inturned flange 4. The member 3 has a tight fit with the fixed member 1. Carried within the cylindrical member is a member 5 made of a flexible material such as, for example, rubber or synthetic rubber or rawhide. The outer portion 6 of this member is sealed to the inner surface of the cylindrical member 3 and when rubber is used, as shown, it is directly bonded to the member. The inner portion 7 of the member is spaced radially inwardly from the outer portion and is connected to said outer portion by a conical web 8. By forming member 5 in this manner, the inner portion 7 is capable of having relative radial movement with respect to the outer portion 6 and yet no fluid such as grease or oil can pass between these inner and outer members because of the imperforate connecting web 8.

The inner surface of the inner portion 7 carries an annular ridge 9 which is of V-shaped radial cross-section in order to produce a flexible edge for engagement with the surface of the shaft 2. Thus by means of this annular ridge there is provided an annular sealing surface which can have pressure engagement with the surface of the shaft to thus make a seal therewith and prevent grease, oil, and so forth from passing the seal from the right to the left. The sealing action is brought about by having the inner diameter of the ridge slightly less than the diameter of the shaft with which the seal is to cooperate. Thus when the seal is placed on the shaft, a portion of the ridge will be flexed, as shown in Figure 2, and cause the ridge to have pressure engagement with the shaft surface.

The seal just described is of known construction and is capable of giving fairly satisfactory sealing action when originally installed but will become inefficient after a short period of time. The inefficiency results from the failure of the ridge to maintain proper sealing engagement with the shaft surface, such failure being caused by the eccentric movement between the shaft and the fixed member 1. Rotation of the shaft relatively to the seal will cause some wear on the sealing ridge 9 but the eccentric movement of the shaft, which is always present in some degree in order that the shaft can rotate freely in its bearings, will cause the greatest wear and damage to the seal. The greater the eccentric movement the more rapid the wear of ridge 9 as there will be greater opposition to the eccentric movement under such conditions due to the conical connecting web 8. As the ridge wears, it will fail to engage the shaft surface with sufficient pressure to cause a continued good sealing action.

In accordance with my invention I provide means carried by the inner portion 7 of the seal for preventing the thrust caused by the eccentric movement of the shaft from acting on the sealing ridge 9. Thus the wear of the ridge will be decreased to a minimum and consequently the life of the seal will be greatly increased. As shown in Figures 1 and 2, my improvement takes the form of a non-expansible flat ring 10 carried by the inner portion 7 of the seal and closely adjacent ridge 9. The inner diameter of this non-expansible ring is substantially the same as that of the shaft, being only of such greater diameter as to permit the shaft to freely rotate within the ring. The ring 10 is preferably made of good bearing material such as, for example, brass or bronze, since this ring is to take the thrust force caused by the eccentric movement of the shaft. In order that the ring 10 may be held in proper position on the inner portion 7, there is provided a flange 11 and a second flat ring 12 which overlies the outer surface of the inner portion 7. By means of this arrangement the portion 7 will be confined between the rings. The rings can be bonded to portion 7 if such is found desirable. This second ring is of somewhat greater width than ring 10 in order that it may extend over the surface of portion 7 which is radially opposite ridge 9. Thus ring 12 will have the added function of giving a backing to the ridge and prevent it from having any relative radial movement with respect to ring 10. If ridge 9 did not have a backing such as is provided by ring 12, any excessive eccentric movement of the shaft 2 would cause the apex part of ridge 9 to be pulled away from the shaft surface by web 8 on the side opposite the eccentric movement, thus decreasing its sealing action at this point and causing leakage.

From the foregoing description it is apparent that in a seal which is provided with a thrust ring in accordance with my invention the wear on the sealing ridge will be decreased to a minimum. As the shaft rotates and the eccentric movement takes place, ring 10 will have a slight radial movement as determined by the eccentric movement of the shaft although the shaft will be rotating relatively to the ring. The ring will take all the thrust force resulting from the eccentric movement and the only force which will be present between the ridge and the shaft surface will be that caused by the flexing of the material of the ridge. Since the ring is positioned adjacent the ridge and has direct bearing on the shaft, the relationship between the ridge and the shaft will always remain the same under all conditions. The thrust force resulting from the eccentric movement of the shaft, which would be taken by ridge 9 if ring 10 were not present, is now entirely taken by the ring. Since this thrust force will not be effective on the ridge, there will be no wear of the ridge from this thrust force. As ring 10 moves with the eccentric movement of the shaft, the outer ring 12 will always maintain portion 7 in its original position and will prevent web 8 on the side opposite the eccentric movement from pulling ridge 9 completely out of engagement with the shaft or partially weaken the pressure by which it engages the shaft. It is thus seen that the efficiency of the seal will be maintained over a long period of time as the thrust wear on the ridge is eliminated and means are also provided for preventing the ridge from being pulled away from the shaft as the result of eccentric movement of the shaft. The improved seal is found to be far superior to present seals, especially on shafts which have a large amount of eccentric movement as when they are connected to another rotating member by a universal joint.

In Figure 3 I have shown a slightly modified seal construction. All the parts are the same as described in connection with Figures 1 and 2 with the exception that the outer ring 12 has been replaced by an outer ring 12' of the same width as ring 10. Such a narrow ring 12' does not give any backing to ridge 9 but this backing is supplied by the use of a garter spring 13 which surrounds the inner portion 7 of the seal radially opposite ridge 9. Thus with this garter spring any tendency of the ridge to be pulled off the shaft by the eccentric movement of the shaft will be opposed by the action of the garter spring.

In Figure 4 a slightly different seal construction is shown. The outer cylindrical housing member 3' has its flange 4' on the opposite end. The member 5' which is carried in the cylindrical member 3' comprises an outer portion 6' and an inner portion 7', said portions being connected together by a V-shaped web 8'. The inner portion 7' is provided with a ridge 9. Also associated with said inner portion is the thrust ring 10 and the outer concentric ring 12 united to said thrust ring by flange 11. By connecting portions 6' and 7' by a V-shaped web 8', there will be less tendency of ridge 9 being pulled away from the shaft on the side opposite the eccentric movement of said shaft as the shaft rotates. In other words, the V-shaped web 8' will present less opposition to relative radial movement between portions 6' and 7'. The seal operates in the same manner as the seal of Figure 1.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a seal for association with a shaft and a surrounding member, said seal comprising an outer portion adapted to be fixed to the member, an inner portion provided with an annular sealing surface in the form of a yieldable ridge adapted to have pressure engagement with the shaft by a radial yielding of the ridge and means integrally connecting said portions but permitting relative radial movement, and two non-expansible rings rigidly connected in concentric relation and carried by the inner portion of the seal, the inner ring having substantially the same inner diameter as the shaft and being positioned on the inner side of the inner portion and adjacent the sealing ridge surface to thereby prevent change in the pressure engagement of the ridge with the shaft and the outer ring overlying the inner portion radially opposite the sealing surface.

2. In a seal for association with a shaft and a surrounding member, a cylindrical member for engaging the surrounding member, a member of rubber or like material having an outer annular portion secured to the cylindrical portion, an inner annular portion for surrounding the shaft and an integral annular connecting web permitting the inner portion to have radial movement with respect to the outer member, said inner portion being provided with an annular integral ridge the inner diameter of which is less than the diameter of the shaft surface, and a non-expansible ring of bearing material surrounding the shaft and of a diameter substantially the same as said shaft, said ring being snugly carried on the inside of the inner portion of said rubber member and closely adjacent the ridge.

3. In a seal for association with a shaft and a surrounding member, a cylindrical member adapted for engaging the surrounding member, a member of rubber or like material having an outer annular portion secured to the cylindrical portion, an inner annular portion for surrounding the shaft and an integral annular connecting web permitting the inner portion to have radial movement with respect to the outer member, said inner portion being provided with an annular integral ridge the inner diameter of which is less than the diameter of the shaft surface, a non-expansible ring of bearing material surrounding the shaft and of a diameter substantially the same as said shaft, said ring being positioned in engagement with the inside surface of the inner portion of said rubber member and closely adjacent the ridge, and a second non-expansible ring overlying and engaging the outer surface of said inner portion radially opposite the ridge.

4. In a seal for association with a shaft and a surrounding member, said seal comprising an outer portion adapted to be fixed to the member, an inner portion provided with an annular sealing surface adapted for pressure engagement with the shaft and means connecting said portions permitting relative radial movement, two non-expansible rings rigidly connected in concentric relation and carried by the inner portion of the seal, the inner ring having substantially the same inner diameter as the shaft and being positioned on the inner side of the inner portion and adjacent the sealing surface and the outer ring overlying the inner portion, and a garter spring surrounding the outer surface of the inner portion and being positioned radially opposite the sealing surface.

5. In a seal for use with a shaft to close off the space present between the shaft and a surrounding member, the provision of an annular one-piece packing member of flexible material having an outer mounting portion and an inner shaft-engaging portion, said inner portion being integral with the outer portion and being sleeved out axially along the shaft in the form of a thin flexible tube, the free end of said inner portion being bodily movable radially of said outer portion with but comparatively little resistance and being provided with a sealing lip and a bearing ring alongside the lip, said ring being substantially rigid and being adapted to ride on and follow the shaft, and said lip being soft and readily compressible and being adapted to be centered by the ring on the shaft regardless of the position of the latter.

6. In a seal for use with a shaft to close off the space present between the shaft and a surrounding member, the provision of an annular one-piece packing member of flexible material having an outer mounting portion and an inner shaft-engaging portion, said inner portion being integral with the outer portion and being sleeved out axially along the shaft in the form of a thin flexible tube, the free end of said inner portion being bodily movable radially of said outer portion with but comparatively little resistance and being provided with a sealing lip and a bearing ring alongside the lip, said ring being substantially rigid and being adapted to ride on and follow the shaft, and said lip being of V-shaped cross-section with the internal diameter thereof at the apex slightly less than the diameter of the shaft so as to have pressure engagement therewith as a result of yielding of the material and being adapted to be centered by the ring on the shaft regardless of the position of the latter.

7. A seal for association with two relatively rotatable members one of which is provided with a smooth annular surface for sealing purposes, said seal embodying non-rotatably connected portions one of which is provided with a yieldable annular sealing surface in the form of a V-shaped ridge positioned so that its apex can engage the smooth surface of said one relatively rotatable member and be flexed toward its base and the other portion adapted to be secured to the other rotatable member, and a non-yieldable member carried by the portion having the ridge and provided with an annular surface closely adjacent the ridge for also engaging the smooth annular surface of said one relatively rotatable member, said ridge having its apex arranged to normally extend beyond the annular surface of the non-yieldable member so that when said seal is placed in operative position with the non-yieldable member engaging the smooth surface of said one relatively rotatable member the apex of the ridge will be flexed toward its base the extended distance and thereby caused to engage the smooth surface with a uniform pressure which pressure will be maintained by the non-yieldable member.

8. A seal for association with two relatively rotatable members one of which is provided with a cylindrical surface, said seal embodying a portion provided with a yieldable annular sealing surface in the form of a general V-shaped ridge positioned so that its apex part can engage the cylindrical surface of said one member and be flexed toward the body of said portion and a second portion adapted to be secured to the other rotatable member, and a non-expansible ring carried by the portion having the ridge and being positioned closely adjacent the ridge, said ring having a cylindrical surface of a diameter substantially the same as the diameter of the cylindrical surface of said rotatable member and arranged to cooperate therewith and said ridge in its normal condition extending slightly beyond the cylindrical surface of the ring so that when the seal is in operative position the apex part of the ridge will be flexed toward the body of the portion on which it is carried the extended distance and thereby caused to have a substantially uniform pressure with the cylindrical surface which pressure will be maintained by the ring regardless of eccentric rotation of the said member having the cylindrical surface.

9. A seal for association with a shaft and a surrounding member, said seal comprising a flexible diaphragm secured to said surrounding member and provided with a yieldable annular sealing surface in the form of a V-shaped ridge positioned so that its apex can engage the shaft surface and be flexed toward its base, and a non-expansible rigid ring carried by the seal and being positioned closely adjacent the ridge, said ring having an inner diameter substantially the same as the outer diameter of the shaft and adapted to be mounted on the shaft when the seal is in position and said ridge having an inner diameter less than the shaft diameter when in its normal condition so as to extend slightly beyond the inner surface of the ring whereby when the seal is in operative position the apex of the ridge will be flexed toward its base the extended distance and thereby caused to engage the shaft surface with a substantially uniform pressure which will be maintained by the ring notwithstanding eccentric rotation of said shaft.

NOEL S. REYNOLDS.